(12) United States Patent
Wooten (10) Patent No.: US 12,553,250 B2
(45) Date of Patent: Feb. 17, 2026

(54) ACCESSORY FILTRATION SYSTEM FOR SWIMMING POOLS

(71) Applicant: Jimmie Nathan Wooten, Melissa, TX (US)

(72) Inventor: Jimmie Nathan Wooten, Melissa, TX (US)

(*) Notice: Subject to any disclaimer, the term of this patent is extended or adjusted under 35 U.S.C. 154(b) by 369 days.

(21) Appl. No.: 18/301,140

(22) Filed: Apr. 14, 2023

(65) Prior Publication Data

US 2024/0117649 A1      Apr. 11, 2024

Related U.S. Application Data

(60) Provisional application No. 63/363,102, filed on Apr. 15, 2022.

(51) Int. Cl.
| | | |
|---|---|---|
| *E04H 4/12* | (2006.01) | |
| *B01D 29/23* | (2006.01) | |
| *B01D 35/147* | (2006.01) | |
| *C02F 1/00* | (2023.01) | |
| *C02F 103/42* | (2006.01) | |

(52) U.S. Cl.
CPC ........... *E04H 4/1209* (2013.01); *B01D 29/23* (2013.01); *B01D 35/1475* (2013.01); *C02F 1/001* (2013.01); *C02F 2103/42* (2013.01); *C02F 2201/005* (2013.01)

(58) Field of Classification Search
CPC ..... E04H 4/1209; E04H 4/1636; B01D 29/23; B01D 35/1475; C02F 1/001; C02F 2103/42; C02F 2201/005
USPC .................................................... 210/167.19
See application file for complete search history.

(56) References Cited

U.S. PATENT DOCUMENTS

| | | |
|---|---|---|
| 2,468,328 A | 4/1949 | Hill |
| 2,557,557 A | 6/1951 | Newcum |
| 2,989,185 A | 6/1961 | Lombardi |
| 3,002,870 A | 10/1961 | Belgrade |
| 3,186,550 A | 6/1965 | Beduhn |
| 3,268,079 A | 8/1966 | Sharrow, Jr. |
| 3,355,021 A | 11/1967 | Jones |
| 3,402,817 A | 9/1968 | Dovel |

(Continued)

FOREIGN PATENT DOCUMENTS

CN      203476690 U   *   3/2014

OTHER PUBLICATIONS

Translation of Wu (CN 203476690U) (Year: 2014).*

*Primary Examiner* — Ekandra S. Miller-Cruz
(74) *Attorney, Agent, or Firm* — Gary L. Eastman, Esq.; Eastman IP (57) ABSTRACT

An accessory pool filter system prevents larger debris from entering the pool's primary filter and potentially interfering with its operation. The system includes a bucket-shaped body with an inlet near the top, a straining basket inside, and an outlet near the bottom. The inlet is connected to an intake hose, and the outlet is connected to an outlet hose, which in turn connects to the pool's main filtration system. The apparatus uses the suction created by the pool filtration system's pump to draw water through the intake hose and pass it through the strainer before it continues on through the inlet to the pool's main filtration system. As the water passes through the system, larger debris is trapped in the basket, thereby preventing it from clogging up the lines of the pool's main filtration system.

15 Claims, 7 Drawing Sheets

(56) References Cited

U.S. PATENT DOCUMENTS

| | | |
|---|---|---|
| 3,701,433 A | 10/1972 | Krakauer |
| 3,767,055 A | 10/1973 | Flatland |
| 3,970,556 A | 7/1976 | Gore |
| 4,032,449 A | 6/1977 | De Visser |
| 4,105,557 A | 8/1978 | Weatherholt |
| 4,166,792 A | 9/1979 | Offer |
| 4,268,386 A | 5/1981 | May |
| 4,348,192 A | 9/1982 | Pansini |
| 4,626,358 A | 12/1986 | Fetsko |
| 4,705,629 A | 11/1987 | Weir |
| 4,746,424 A | 5/1988 | Drew |
| 4,746,425 A | 5/1988 | Stickler |
| 4,749,477 A | 6/1988 | McGregor |
| 4,781,827 A | 11/1988 | Shields |
| 4,802,592 A | 2/1989 | Wesels |
| 4,826,591 A | 5/1989 | Macia |
| 4,889,622 A | 12/1989 | Newcombe-Bond |
| 4,930,168 A | 6/1990 | Ferlise |
| 4,988,437 A | 1/1991 | Gefter |
| 5,024,761 A | 6/1991 | Deibel |
| 5,100,541 A | 3/1992 | Kallenbach |
| 5,105,848 A * | 4/1992 | Kallenbach .......... F16L 55/043 137/526 |
| 5,124,032 A | 6/1992 | Newhard |
| 5,143,605 A | 9/1992 | Masciarelli |
| 5,202,020 A | 4/1993 | Desjoyaux |
| 5,238,585 A | 8/1993 | Reed, Sr. |
| 5,338,446 A * | 8/1994 | Schuman .......... E04H 4/1645 210/453 |
| 5,370,793 A | 12/1994 | Sugimoto |
| 5,554,277 A * | 9/1996 | Rief .......... B01D 29/117 210/232 |
| 5,584,990 A | 12/1996 | Sugimoto |
| 5,584,992 A | 12/1996 | Sugimoto |
| 5,632,890 A | 5/1997 | Sugimoto |
| 5,864,896 A * | 2/1999 | Ferraro .......... E04H 4/1218 4/490 |
| 5,879,547 A | 3/1999 | Desjoyaux |
| 6,088,842 A | 7/2000 | Barnett |
| 6,217,754 B1 | 4/2001 | Ros |
| 6,340,431 B2 | 1/2002 | Khan |
| 7,594,997 B1 | 9/2009 | Kazarian |
| 8,025,172 B1 | 9/2011 | Zink |
| 9,506,262 B2 | 11/2016 | Tavor et al. |
| 9,896,856 B2 | 2/2018 | Tavor et al. |
| 10,087,646 B2 | 10/2018 | Tavor et al. |
| 10,299,985 B1 | 5/2019 | Collins et al. |
| 10,435,902 B2 | 10/2019 | Taylor |
| 10,850,296 B2 | 12/2020 | Cox |
| 10,918,568 B2 | 2/2021 | Backer |
| 11,008,770 B1 | 5/2021 | Brennan |
| 11,098,721 B2 | 8/2021 | Le |
| 2002/0027097 A1* | 3/2002 | Baer .......... E04H 4/1254 210/167.19 |

\* cited by examiner

FIG. 12

ACCESSORY FILTRATION SYSTEM FOR SWIMMING POOLS

RELATED APPLICATION

This application claims priority to U.S. Provisional Patent Application Ser. No. 63/363,102 for an "Accessory Filtration System for Swimming Pools," filed Apr. 15, 2022, and currently co-pending, the entirety of which is incorporated herein by reference.

FIELD OF THE INVENTION

The present invention relates generally to pool filtration systems. The present invention is particularly, but not exclusively, useful as an accessory filtration system for use with a swimming pool to improve reliability of the primary filtration system.

BACKGROUND OF THE INVENTION

Swimming pools are water-containing structures large enough for swimming, and are common in backyards, fitness centers, resorts, cruise ships, and elsewhere. Uses for swimming pools include recreation, exercise, and competition, and their size can vary depending on intended use and various space, with "Olympic size" swimming pools, which are fifty meters in length, being a common size for competition.

The water in swimming pools contains bacteria, viruses, and parasites that are potential sources of disease. For example, during the years 2000 through 2014, the CDC identified nearly five-hundred outbreaks of disease associated with treated recreational water. Sanitation of swimming pools is therefore extremely important.

Swimming pool sanitation generally involves the use of chlorine as a disinfectant as well as filtration of water. Pool filtration systems use a pump to draw water from the pool, pass it through a filter, and recirculate it into the pool. Filters generally use sand or diatomaceous earth, or sometimes both, to filter out contaminants. Some modern filters use perlite in place of diatomaceous earth.

Because the filter is susceptible to clogging, which interferes with its operation, pool filtration systems generally pass water through a "skimmer" to trap large floating debris before forcing the water through the diatomaceous earth (or sand or perlite) filter. However, the skimmer itself also tends to get clogged up, reducing the effectiveness and reliability of the filtration system. Thus a "hand skimmer," which is a net on the end of a pole, is often used to retrieve leaves, dead insects, and other debris from a pool. However, a hand skimmer, while relatively effective in removing surface debris, can be awkward to use and has inefficiencies for debris below the water's surface partly arising from the need to empty the net every time it is pulled through the water in order to avoid reintroducing captured debris into the pool.

In addition to the hand skimmer, there are also suction hoses which are connected directly into the pump input for the filter system by removal of the skimmer basket and insertion of the suction hose directly into the filter system input. While the ability to direct a suction hose to particular debris is very helpful, these suction hoses either do not have a robust filter system and either clog easily, or pass debris through the hose directly into the pump system. In either case, the risk of filter and pump damage is significant.

In view of the above, it would be advantageous to provide a device that operates to prevent larger debris from clogging up the skimmer or filter of a pool filtration system, thus improving its reliability and efficiency of the filter system.

SUMMARY OF THE INVENTION

Disclosed is an accessory pool filter apparatus that prevents larger debris from entering the pool's primary filter and potentially interfering with its operation. The apparatus includes a bucket-shaped body with an inlet near the top, a straining basket inside, and an outlet near the bottom. The inlet is connected to an intake hose, and the outlet is connected to an outlet hose, which in turn connects to the input to the pool's main filtration system. The apparatus uses the suction created by the pool filtration system's pump to draw water through the intake hose and pass it through the strainer before it continues through the outlet and on through the pool's main filtration system.

The apparatus is mounted to the side of the pool by a bracket that clamps onto the edge of the pool deck and holds the main body of the apparatus under water, where it can efficiently draw water from the pool.

As the water passes through the apparatus, larger debris is trapped in the basket, thereby preventing it from clogging up the lines of the pool's main filtration system, or damaging the pump itself. By removing larger debris and reducing clogs in the pool's main filtration system, reliability and efficiency of the filtration system is improved.

In some embodiments, a pressure relief valve further aids in the reliability of the accessory filtration system, allowing water to enter into the system, and thus also into the pool's main filtration system, when insufficient water is entering through the inlet, e.g., when the accessory filtration system itself may be clogged.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DETAILED DESCRIPTION

Figure 1:
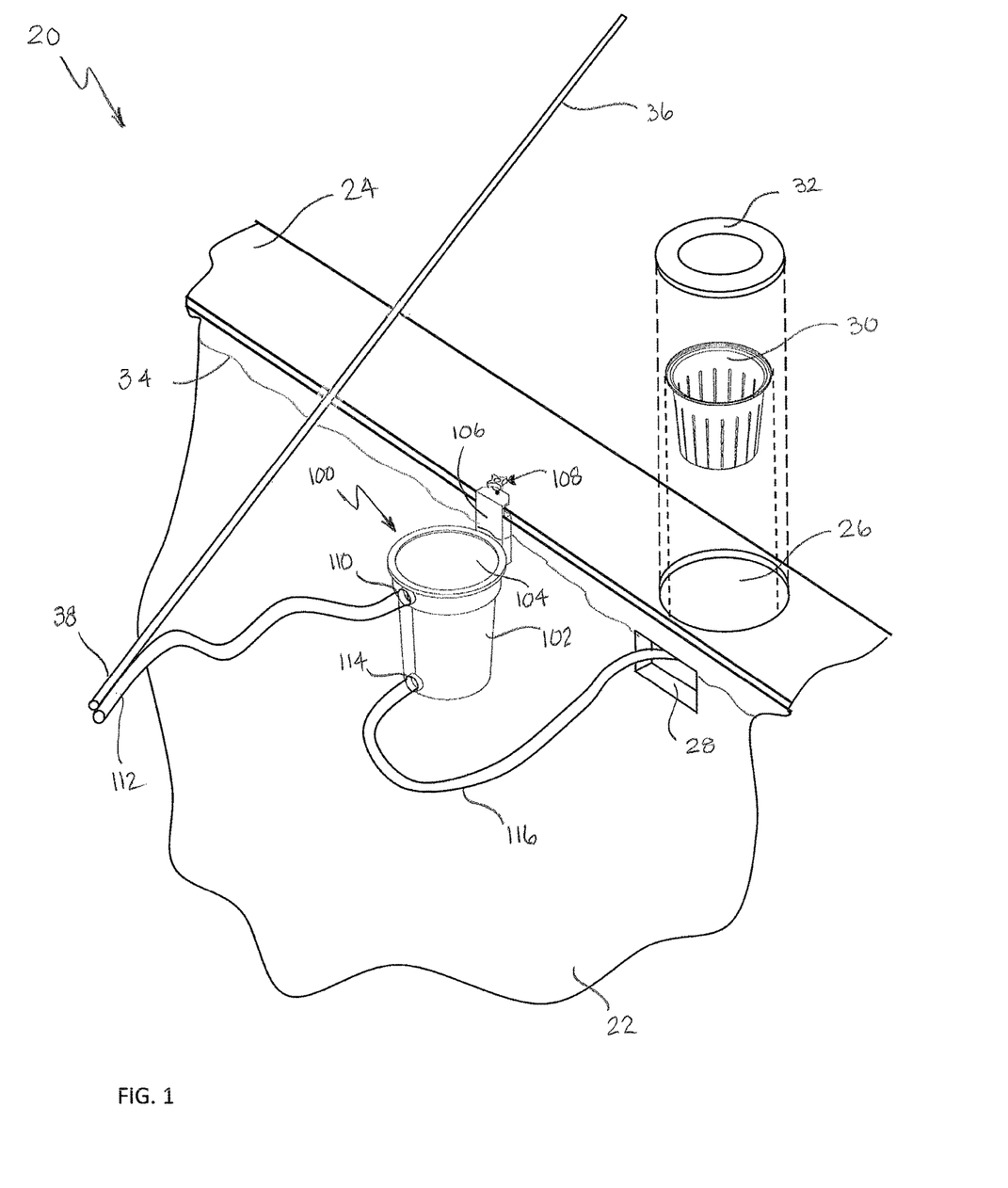
FIG. 1 is a perspective view of a pool with a preferred embodiment of an accessory filtration system installed.

Referring initially to FIG. 1, a typical swimming pool is illustrated and generally designated 20. Pool 20 is defined by boundaries such as wall 22 around a small body of water for swimming. The water in pool 20 requires regular or constant filtration as part of its sanitation process. Deck 24 extends around pool 20 and has an access hatch 26 for skimmer 28, which is the typical entry point for water into the filtration system. Inside skimmer 28 is a skimmer basket 30 that acts as a strainer to capture large pieces of debris, such as leaves inventors: Jimmie Nathan Wooten and dead insects, and prevent them from blocking the flow of water into the pipes in the filtration system. A removable cover 32 covers access hatch 26 during normal use of pool 20, and is removed to clean and replace basket 30. For proper operation, water level 34 is above the bottom of the aperture of skimmer 28, preferably about midway up the aperture, allowing for the ingress of water into skimmer 28.

In pool 20, an accessory filtration system is illustrated and generally designated 100. Filtration system 100 includes a bucket-shaped filter body 102 with a removable lid 104. Body 102 is attached to pool 20 and held under the water line 34 by a bracket 106 that attaches to the edge of pool 20 with a clamp 108. Water is drawn into system 100 at inlet 110 on body 102 through hose 112. After large pieces of debris are filtered out, the water is then discharged through outlet 114 and hose 116 into the inlet for the main filtration system of pool 20. Since hose 116 is connected to the inlet of the main filtration system of pool 20, water is passed through inlet 110, body 102, through strainer basket 136 (shown in FIG. 2) and out outlet 114 by suction from the pump (not shown) of the main filtration system of pool 20.

In preferred embodiments an extension pole 36 attaches near its distal end 38 to the end of hose 112, allowing a user to direct the end of hose 112 in order to suck debris from the pool into system 100.

Figure 2:
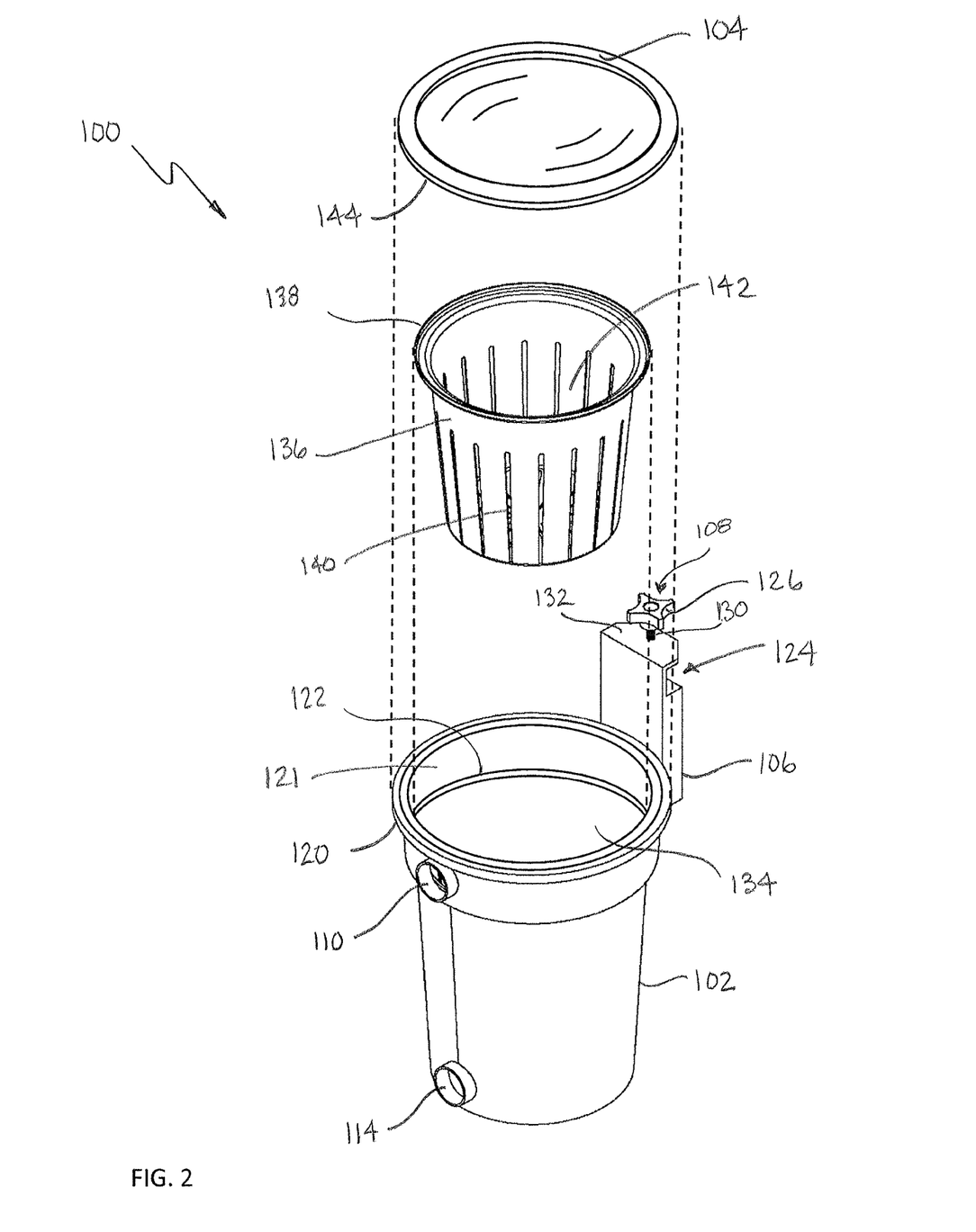
FIG. 2 is an exploded view of a preferred embodiment of the accessory filtration system of the present invention.

Referring now to FIG. 2, an exploded view of accessory filtration system 100 is illustrated, showing various components present in a preferred embodiment. At the top of body 102 is a rim 120 where domed lid 104 attaches. Lid 104 is domed so as to provide structural integrity when the pool pump creates a vacuum within body 102. A top portion 121 of body 102 commences at rim 120 and has a broader diameter than the rest of body 102. Top portion 121 terminates in lower inner rim 122.

Inlet 110 and outlet 114 are located on the front of body 102. Bracket 106 is attached at the rear of body 102, and has an aperture 124 facing away from body 102, which, together with clamp 108, enables bracket 106 to be clamped to deck 24 (see FIG. 1) at the edge of pool 20 (see FIG. 1). Clamp 108 is used by engaging knob 126, which drives bolt 130 through top portion 132 of bracket 106 to capture the edge of pool 20 therein.

A strainer basket 136 has a rim 138 at the top which is sized to be supported by rim 122 of body 102 in order to hold the top of strainer basket 136 at rim 122 of body 102. Basket 136 has multiple apertures 140, in the form of slots in a preferred embodiment, for the egress of water while preventing larger particles of debris from passing through basket 136. Thus, when basket 136 is placed into body 102 such that rim 138 sits upon rim 122, water flowing into inlet 110 passes into the opening 142 of basket 136, through apertures 140, which filter out large particles of debris, out of body 102 through outlet 114 and into the inlet for the main filtration system of pool 20 (shown in FIG. 1).

Removable lid 104 has an edge 144 that fits onto the top rim 120 of body 102, thus covering filtration system 100 except when basket 136 is being cleaned or replaced. Lid 104 is sized to closely receive the top rim 120 of body 102 to establish a seal therebetween such that when the pool suction is applied to exit 114, a vacuum is established in body 102 to draw water through inlet 110 and through basket 136.

Figure 3:
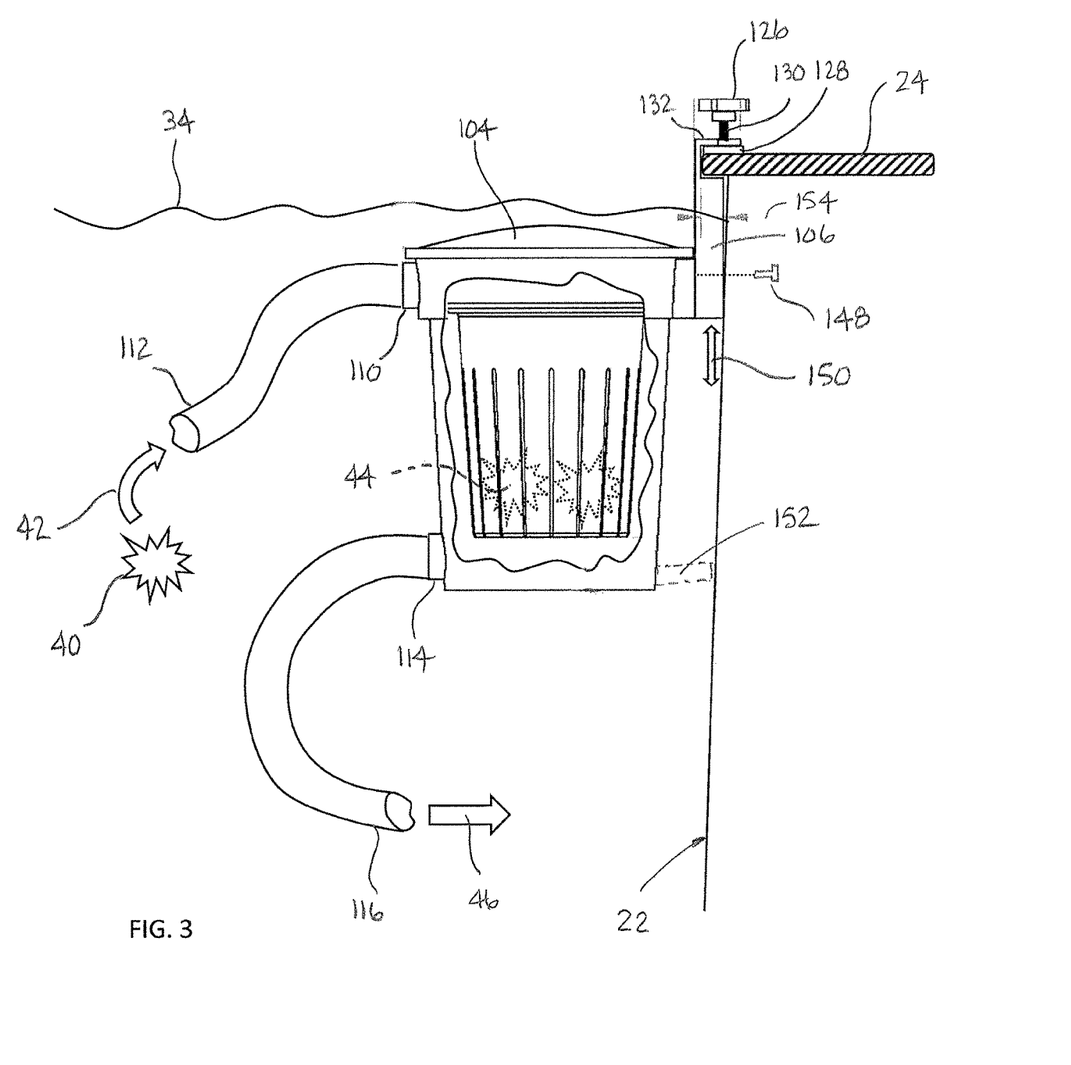
FIG. 3 is a side cutaway view of a preferred embodiment of the accessory filtration system of the present invention.

Referring now to FIG. 3, a cutaway view of a preferred embodiment of accessory filtration system 100 installed in a pool 20 is illustrated, and shows how system 100 is installed and the path taken by water and debris 40 through system 100.

System 100 is installed onto a pool 20 by attaching bracket 106 to the edge of deck 24. Bracket 106 is placed such that the edge of deck 24 extends into the aperture 124 of its clamp 108 portion. Knob 126 is engaged to drive bolt 130 downward, tightening clamp 108 around the deck 24. To protect the deck 24 from damage, bolt 130 terminates in a pad and gripping surface 128, which acts as a buffer between bolt 130 and deck 124, and increases the contact surface between clamp 108 and deck 124 and minimizes damage to the pool deck 124. Thus attached, body 102 of system 100, including lid 104, is kept below the water line 34.

In a preferred embodiment, body 102 is attached to bracket 106 with a bolt 148 along the bottom portion of bracket 106. Bolt 148 can be placed at various positions, or heights, along the bottom portion of bracket 106, allowing body 102 to be raised or lowered in order to remain just below the surface at various water levels 34, as indicated by bidirectional arrow 150. Moreover, a preferred embodiment of body 102 also has a member, or bumper 152, along its rear bottom portion to maintain body 102 in a substantially vertical position and keep the bottom of body 102 from being rotated into wall 22 by the force of the water in the pool 20. Bumper 152 is longer than the width 154 of the aperture 124 as measured along bottom internal surface 146 (see FIG. 4) of clamp 108 such that body 102 is held upright in the water.

Outlet 114 is connected to the inlet of the main filtration system of pool 20 via hose 116; the pump of the main filtration system of pool 20 provides suction for filtration system 100, which creates a vacuum in body 102 and pulls water and debris particles 40 into inlet 110 hose 112, as indicated by directional arrow 42. As hose 112 extends away from body 102 and into pool 20, it is better able to capture debris particles 40 floating or submerged in the water.

When water with debris particles 40 is pulled into accessory filtration system 100, the particles 40 pass through inlet 110 and are trapped in basket 136, as illustrated by trapped particles 144, while the water passes through the basket 136 and proceeds from outlet 114 through hose 116 into the inlet of the main filtration system of pool 20 for further filtration, as indicated by directional arrow 46.

Figures 4, 5:
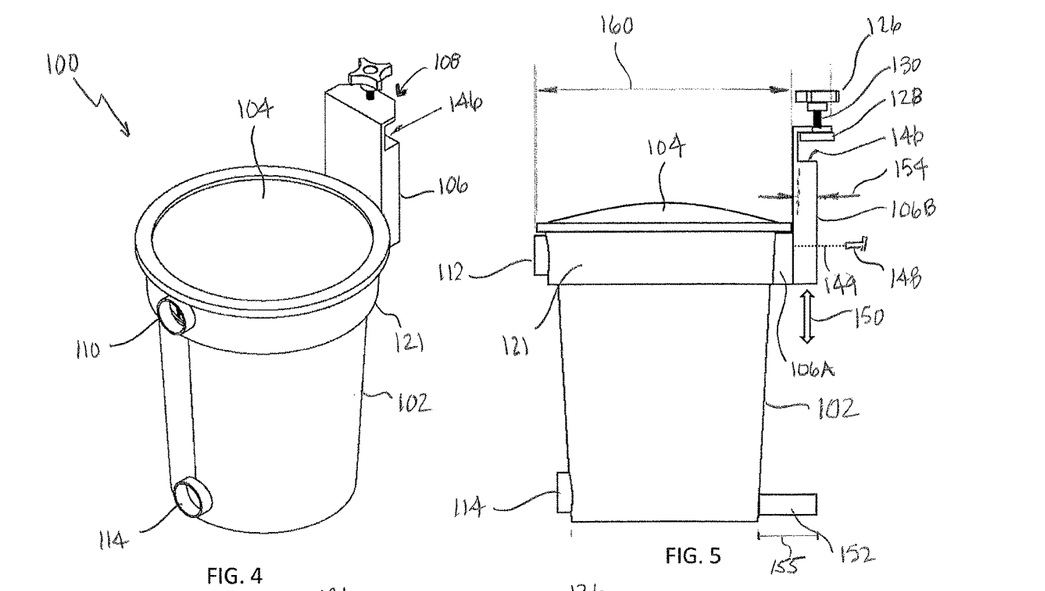
FIG. 4 is a top perspective view of a preferred embodiment of the accessory filtration system of the present invention.
FIG. 5 is a left side view of a preferred embodiment of the accessory filtration system of the present invention.

Referring now to FIG. 4, a top perspective view of accessory filtration system 100 is shown. As shown in FIG. 4, body 102 of system 100 is bucket-shaped, with an extended top portion 121 from which inlet 110 extends. Outlet 114 is located on the same front side of body 102 near the bottom. Inlet 110 and outlet 114 each include an aperture allowing ingress and egress, respectively, of water, and a connector for their corresponding hoses 112 and 116 (shown in FIGS. 1 and 3). While inlet 110 and outlet 114 are shown aligned on the same side of body 102, it is to be appreciated that the position is optimal for some manufacturing techniques, but is not a requirement for the accessory filtration system of the present invention.

Bracket 106 is attached to the rear side of body 102 and extends above the top of body 102 and removable lid 104 so that its clamp 108 portion is high enough to keep body 102 and removable lid 104 submerged during use.

Referring now to FIG. 5, a side view of accessory filtration system 100 is shown. As illustrated in FIG. 5, bracket 106 is attached to a bracket connector member 106A formed of and extending from the rear side of top portion 121 of body 102. In a preferred embodiment, bracket 106 is held in place by bolt 148 placed through slidable bracket portion 106B at insertion point 149 and extending into connector member 106A of body 102. A preferred embodiment of bracket 106 has multiple insertion points 149 at various heights on its lower portion 106B, thus providing a variable height at which bracket 106 extends above body 102. The variable height allows body 102 and lid 104 to be kept submerged just below water level 34 (shown in FIG. 1) even when water level 34 varies from pool to pool, or throughout the seasonal usage of a pool.

Bumper 152 has a length 155 such that its distal end is generally aligned with the outer edge of lower portion 106B of bracket 106, or, in other words, its distal end is more or less equidistant from the center of body 104 with the outer edge of lower portion 106B.

Lid 104 has a diameter 160, which is approximately the distance from the outer edge of connector member 106A, where body 102 joins bracket 106, to the outer edge of inlet 112, thus defining the distance from the edge of pool 20 (shown in FIG. 1) at which water is drawn into filtration system 100.

Figure 6:
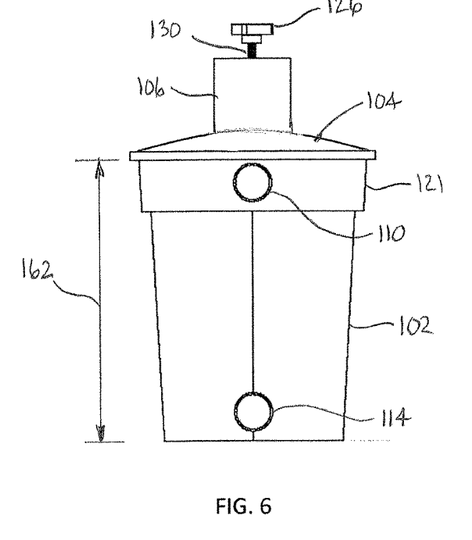
FIG. 6 is a front view of a preferred embodiment of the accessory filtration system of the present invention.

Referring now to FIG. 6, a front view of accessory filtration system 100 is shown. The curvature of a preferred embodiment of lid 104 is illustrated, as is the height 162 of body 102, which defines the approximate vertical distance between the point where water enters body 102 at inlet 110 and the point at which it exits body 102 at outlet 114.

Figure 7:
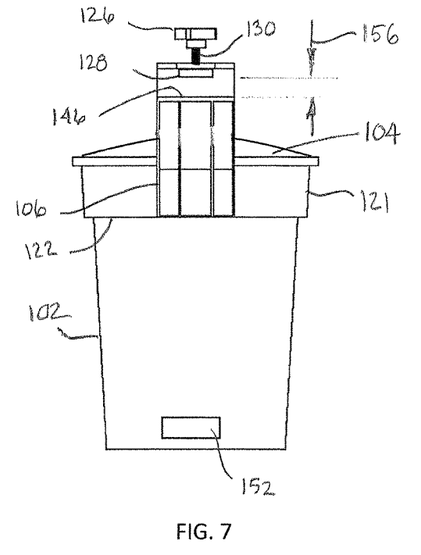
FIG. 7 is a rear view of a preferred embodiment of the accessory filtration system of the present invention.

Referring now to FIG. 7, a rear view of accessory filtration system 100 is shown. In clamp 108, the vertical distance 156 from the bottom of gripping surface 128 to the bottom internal surface 146 of clamp 108 varies with position of bolt 130 as adjusted by knob 126. This distance 156 is decreased as knob 126 is adjusted to tighten clamp 108 against deck 24 (shown in FIG. 1), and increased as knob 126 is adjusted to loosen clamp 108 to remove clamp 108 from deck 24 and system 100 from the pool 20 (shown in FIG. 1). The range of maximum to minimum distance 156 defines the thicknesses of the edge of deck 24 with which a particular embodiment of filtration system 100 can be used, however, it is anticipated that distance 156 will be sufficient for use with most pools of standard design.

As illustrated in FIG. 7, bracket 106, connected near the top of body 102, is horizontally aligned with bumper 152, both being on the rear side of body 102. Because of the horizontal alignment, and the length 155 (shown in FIG. 5) that causes the distal end of bumper 152 to be equidistant from the center of body 104 with the outer edge of lower portion 106B of bracket 106, bumper 152 keeps body 102 in a substantially upright position in pool 20 (shown in FIG. 1). In other words, bumper 152 prevents body 102 from being tilted by the forces of water against it, allowing filtration system 100 to operate at maximal efficiency at all times.

Figure 8:
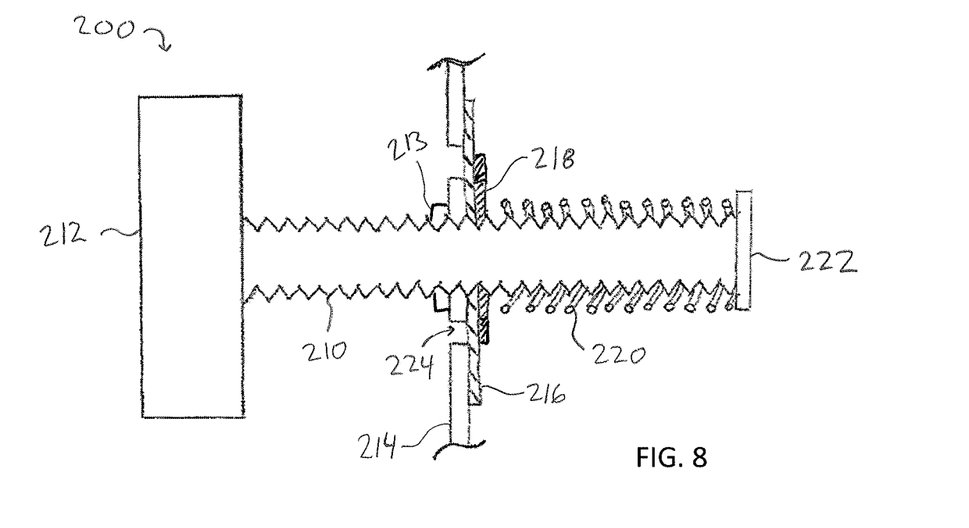
FIG. 8 is a side cutaway view of a pressure relief valve for an accessory filtration system of the present invention.

Referring now to FIG. 8, some preferred embodiments of filtration system 100 (shown in FIG. 1) include a pressure relief valve 200 to prevent too much vacuum in the system 100. A preferred embodiment of pressure relief valve 200 includes a threaded body 210 with a handle 212 that is rotatable to adjust the tension of the valve 200. Valve 200 is attached with nut 213 or another attachment mechanism to wall 214 separating the internal portions of system 100 from the water of pool 20 (shown in FIG. 1). A flexible seal 216 around threaded body 210 is held in place with washer 218 and spring 220. Threaded body 210 terminates at the end opposite handle 212 at end stop 222 which holds spring 220 in place between itself and washer 218.

The flexible seal 216, made of rubber in a preferred embodiment, covers an aperture 224 in wall 214, thereby preventing the entry of water through valve 200 into system 100 (shown in FIG. 1). However, a vacuum in system 100 results in a pressure differential between the outside and inside of wall 214, and the water from pool 20 then provides pressure against seal 216. When this pressure differential is sufficiently strong to push against spring 220, water flows through aperture 224 into the inside of system 100, thus relieving the pressure differential. Rotating handle 212 adjusts the compression of spring 220, thereby increasing or decreasing—depending on the direction of rotation—the amount of vacuum required for entry of water through valve 200.

Figure 9:
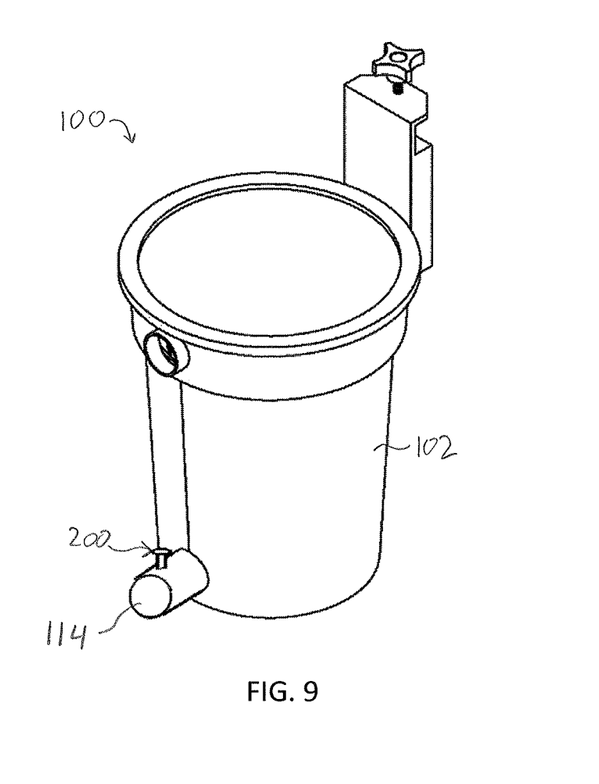
FIG. 9 is a perspective view of an accessory filtration system with a pressure relief valve installed at its outlet.

Referring now to FIG. 9, there are a few locations in which valve 200 can be placed in system 100, and one preferred embodiment is illustrated in which valve 200 is integral to the outlet 114 of filtration body 102 or tank of system 100.

Figure 10:
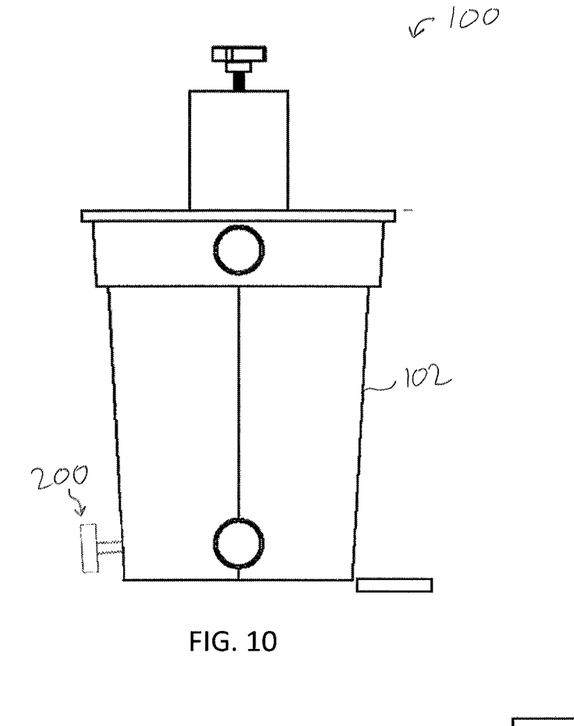
FIG. 10 is a front view of an accessory filtration system with a pressure relief valve installed on a side.

Referring now to FIG. 10, another preferred embodiment of a system 100 with a relief valve 200 is illustrated in which valve 200 is placed on the side of filtration body 102. In a variant of this embodiment, the wall of body 102 is used as wall 214 (shown in FIG. 8) of the valve 200.

Figure 11:
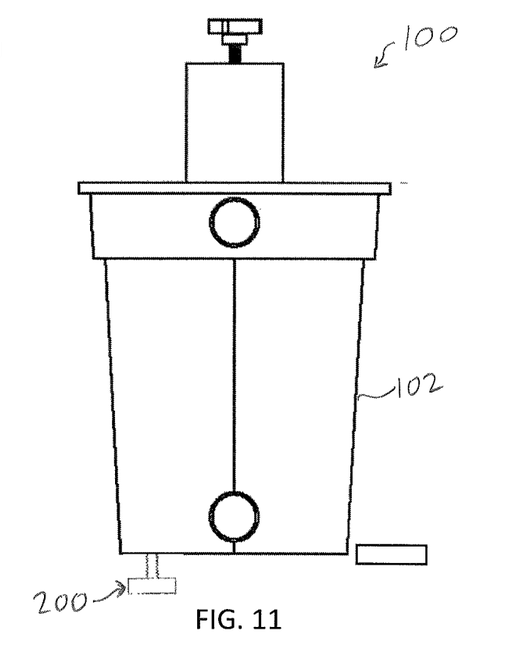
FIG. 11 is a front view of an accessory filtration system with a pressure relief valve installed on the bottom.

Referring now to FIG. 11, another preferred embodiment of a system 100 with a relief valve 200 is illustrated in which valve 200 is placed on the bottom of filtration body 102. In a variant of this embodiment, the bottom surface of body 102 is used as wall 214 (shown in FIG. 8) of the valve 200.

Figure 12:
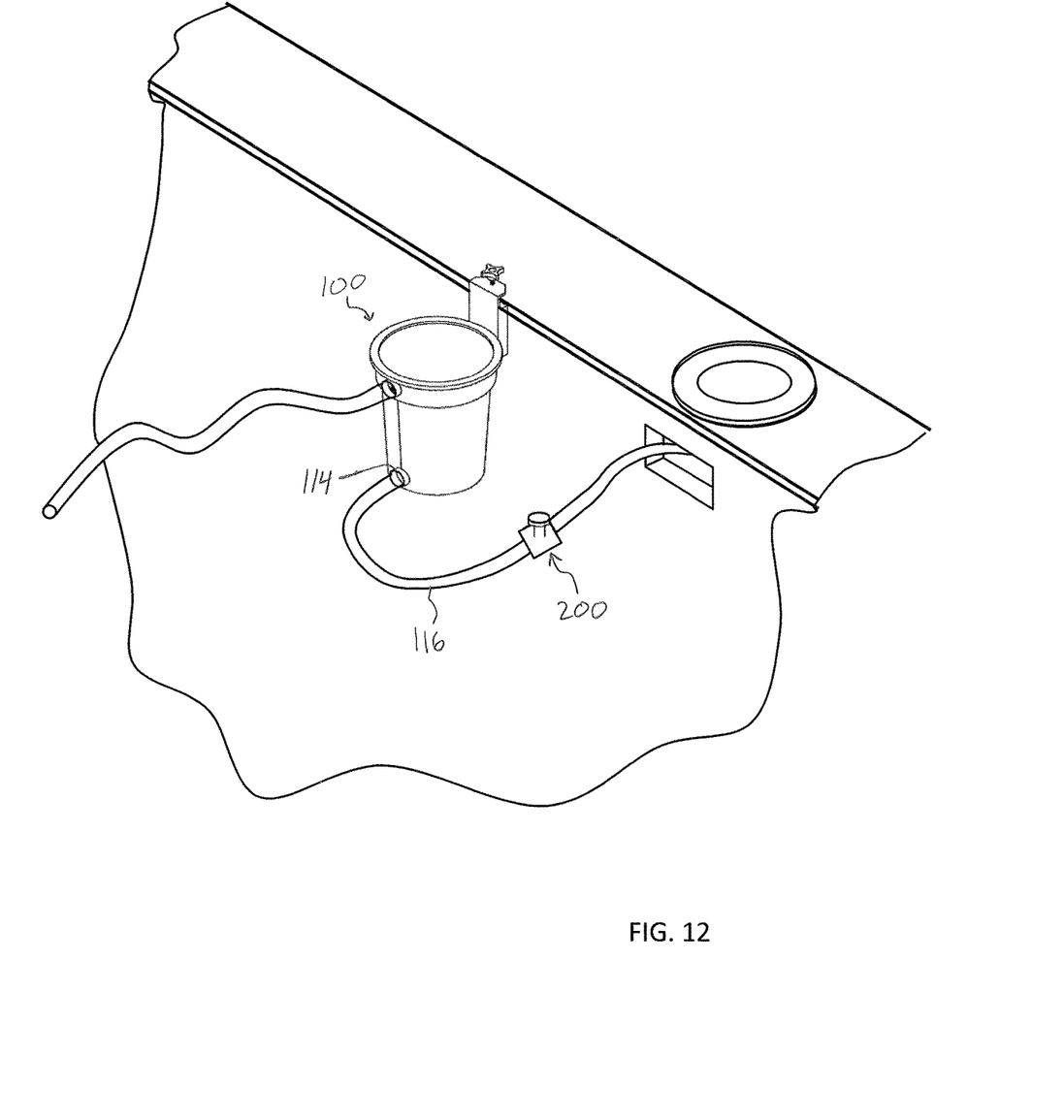
FIG. 12 is a perspective view of an accessory filtration system installed in a pool with a pressure relief valve on the outlet hose.

Referring now to FIG. 12, another preferred embodiment of a system 100 with a relief valve 200 is illustrated in which valve 200 is attached to hose 116. Having the pressure relief valve 200 in line on hose 116 allows for easy access to replace valve 200 or adjust the tension of the valve 200.

Additional embodiments having multiple relief valves 200, including valves 200 at the various combinations of the locations described above, are fully contemplated While there have been shown what are presently considered to be preferred embodiments of the present invention, it will be apparent to those skilled in the art that various changes and modifications can be made herein without departing from the scope and spirit of the invention.

What is claimed is:

1. An accessory filtration system, comprising:
a bucket-shaped body having a top and a bottom;
an inlet near the top of the bucket-shaped body and having an intake hose, the intake hose having a first end at the inlet and a second end away from the inlet;
an outlet near the bottom of the bucket-shaped body and having an outlet hose;
a straining backet inside the bucket-shaped body,
wherein the accessory filtration system is configured to use a suction created by a pool filtration system to draw water through the intake hose, pass it through the filtration bucket, and allow it to continue to the pool filtration system through the outlet hose;

a pressure relief valve having a threaded body with a first end that is attached to a knob and a second end that is attached to an end stop; and a washer that is placed against a flexible seal and a spring that are located between the washer and the end stop.

2. The accessory filtration system of claim 1, further comprising an extension pole having a distal end attached to the second end of the intake hose.

3. The accessory filtration system of claim 1, further comprising a domed lid removably attached to the top of the bucket-shaped body.

4. The accessory filtration system of claim 3, wherein the lid is configured to create a seal between itself and a top rim of the bucket-shaped body.

5. The accessory filtration system of claim 1, further comprising a bracket attached to the bucket-shaped body on a side opposite the inlet and the outlet, the bracket extending above the bucket-shaped body and having a clamp configured to be clamped to a deck at an edge of a pool such that the top of bucket-shaped body is maintained underneath the water.

6. The accessory filtration system of claim 5, wherein the clamp comprises a bolt terminating in a pad and gripping surface configured to contact the deck, and a knob configured to drive the bolt to tighten the clamp around the deck.

7. The accessory filtration system of claim 5, wherein a location of attachment of the bracket to the bucket-shaped body is adjustable in order to raise or lower the bucket-shaped body.

8. The accessory filtration system of claim 5, further comprising a bumper near the bottom of the bucket-shaped body attached to the same side as the bracket, the bumper configured to maintain the bucket-shaped body upright in the water.

9. The accessory filtration system of claim 1, wherein the pressure relief valve is configured to allow additional water to enter into the accessory filtration system in response to a vacuum inside the accessory filtration system.

10. The accessory filtration system of claim 9, wherein the pressure relief valve is integral to the outlet.

11. The accessory filtration system of claim 9, wherein the pressure relief valve is located on a side of the bucket-shaped body.

12. The accessory filtration system of claim 9, wherein the pressure relief valve is located on the bottom of the bucket-shaped body.

13. The accessory filtration system of claim 9, wherein the pressure relief valve is located along the outlet hose.

14. The accessory filtration system of claim 9, wherein the knob is configured to adjust a tension of the pressure relief valve, thereby adjusting the degree of vacuum necessary to allow water to enter.

15. The accessory filtration system of claim 14, wherein the knob holds in place the flexible seal over an aperture in a valve wall.

* * * * *